May 10, 1960 R. A. BROWN ET AL 2,936,362
STUD WELDING SYSTEM
Filed Feb. 27, 1958 2 Sheets-Sheet 1

INVENTORS
ROBERT A. BROWN
CHARLES S. CUMMINGS II
BY ROBERT B. HARTMAN II

ATTORNEY

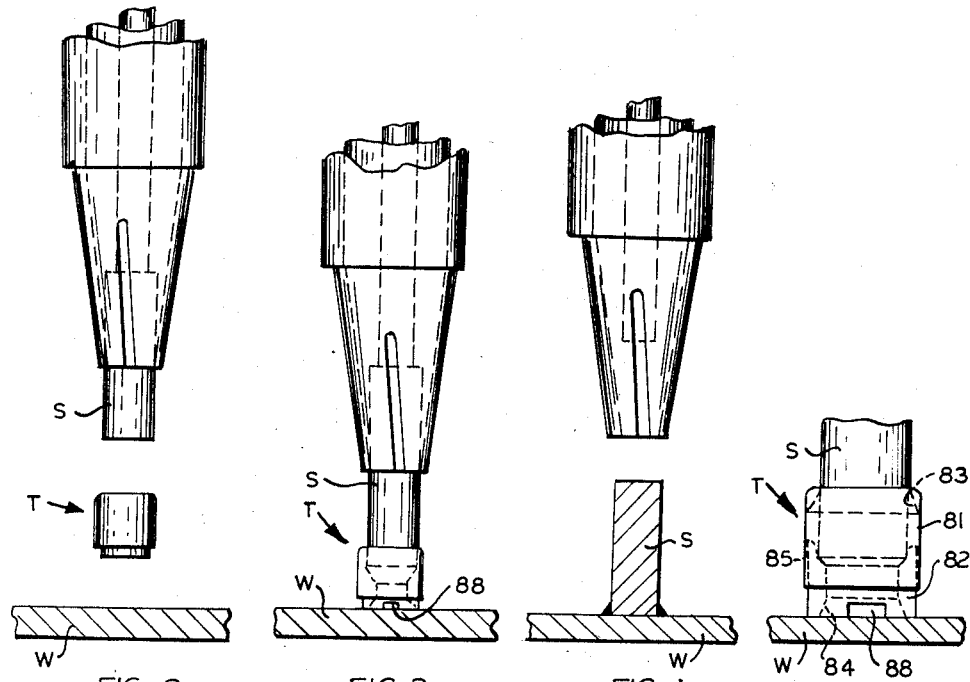
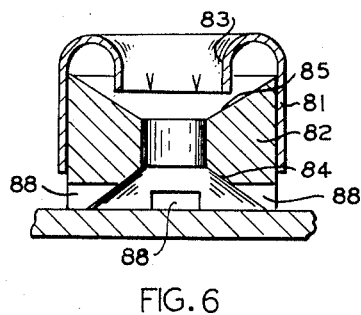
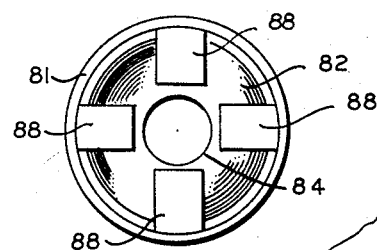
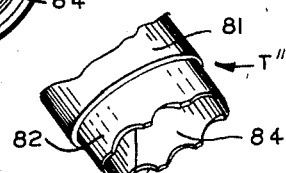
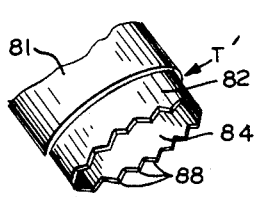

United States Patent Office 2,936,362
Patented May 10, 1960

2,936,362

STUD WELDING SYSTEM

Robert A. Brown, Milford, Charles S. Cummings, Easton, and Robert B. Hartman, Bridgeport, Conn., assignors to Remington Arms Company, Inc., Bridgeport, Conn., a corporation of Delaware Application February 27, 1958, Serial No. 718,074

1 Claim. (Cl. 219—99)

This invention lies in the field of electric arc welding and is limited to a portion thereof known as stud welding which is concerned with the end welding of elongated pin or stud elements to other workpieces.

This invention is more particularly related to the known stud welding process in which a slag-forming or flux-forming solid body having a passageway therethrough is placed on a workpiece, a second workpiece, or stud, is inserted in the passageway against a stop shoulder spaced from the other end of the passageway and the workpiece surface. The stud is firmly held against the stop shoulder in the slag-forming body by means urging the stud toward the workpiece. Electric current is passed through the workpiece, slag-forming body and stud to initiate an arc between the stud and workpiece in the passageway through the slag-forming body. When the heat of the arc has deteriorated the stop shoulder in the passageway the softened stud end is brought into contact with the partly molten workpiece by the means urging them together to form the weld. The current is shut off shortly thereafter.

Issued Patents 2,510,000, dated May 30, 1950, 2,509,999, dated May 30, 1950, 2,587,251, dated February 26, 1952, 2,643,319, dated June 23, 1953, and 2,755,164, dated July 17, 1952, all in the name of Van Der Willigen disclose the process with which the present invention is involved.

Ordinarily some form of tool or means is provided for holding the stud and slag-forming element in position for applying the force to thrust the stud and workpiece into contact with each other when the intervening slag-forming element gives way, and for supplying the current needed at the necessary voltage to initiate the arc and heat the workpieces. The tool shown in this application is fully described in the copending application of Robert B. Hartman, filed February 26, 1958, Serial No. 717,634.

In the past there has occurred, during welding with the present process, a percentage of defective welds in which the fillet of molten metal around the periphery of the stud end at the junction of the stud and workpiece has extended only partially around the stud circumference and the welded joint did not extend over the entire area of the stud end. This has been caused by the pressure of the heated gases confined in the passageway of the slag-forming element bursting through a weak point in the side wall of the timer as the timer is gradually deteriorated by the arc. When this occurs the heated gases, molten metal and slag blow through the timer side wall. This not only causes excessive glare and the undesirable spewing about of the molten metal and slag, but also blows away the molten metal at the stud-workpiece joint, resulting in an incompletely welded unsatisfactory joint. In addition, the joint is of poor appearance due to the fillet metal being blown away.

We have discovered that the above defects can be overcome by the provision of a plurality of radial vents in the wall of the slag-forming element allowing the gases generated by the heat of the arc and deterioration of the slag-forming element together with the molten metal and slag to flow radially in all directions rather than concentrating at one point.

It is the primary object of our invention to provide a slag-forming element of improved design which will prevent the break-through of gas, molten slag and metal at one point which carries away the molten metal which would form the weld and fillet resulting in poor unsatisfactory welds.

It is another object to provide a slag-forming element of improved design which will reduce the glare and spewing about of molten slag and metal.

It is a further object to provide a slag-forming element of improved design, the use of which results in welded stud workpiece joints of improved appearance and strength, with an even fillet of weld metal all the way around the stud workpiece intersection.

Other objects will appear from the following description and appended claim.

We attain the above objects by means, preferred forms of which are illustrated in the accompanying drawings, in which:

Figure 2 is a partial enlarged side view of the tool chuck assembly holding a stud therein, a slag-forming element, and a workpiece to show the relationship before assembly.

Figure 3 is a partial enlarged side view of the tool chuck assembly holding a stud which is engaged with the slag-forming element and held in operative position against the workpiece.

Figure 4 is a partial enlarged side view of the tool chuck assembly withdrawn from the stud which is shown in welded position on the workpiece, stud and workpiece shown in section.

Figure 5 is a partial enlarged side view of the stud and slag-forming element, embodying the features of the present invention, in operative engagement with each other and the workpiece.

Figure 6 is an enlarged side view shown in vertical section of a slag-forming element embodying the features of the present invention.

Figure 7 is a bottom view of the element shown in Figure 6.

Figure 8 is a vertical section through a stud and workpiece showing a normal weld structure.

Figure 9 is a vertical section through a stud and workpiece showing a defective weld of the type which the present invention is intended to overcome.

Figure 10 is a perspective partial view showing the bottom of a slag-forming element embodying a modified version of our invention.

Figure 11 is a perspective partial view showing the bottom of a modified slag-forming element embodying features of our invention.

Figure 1:
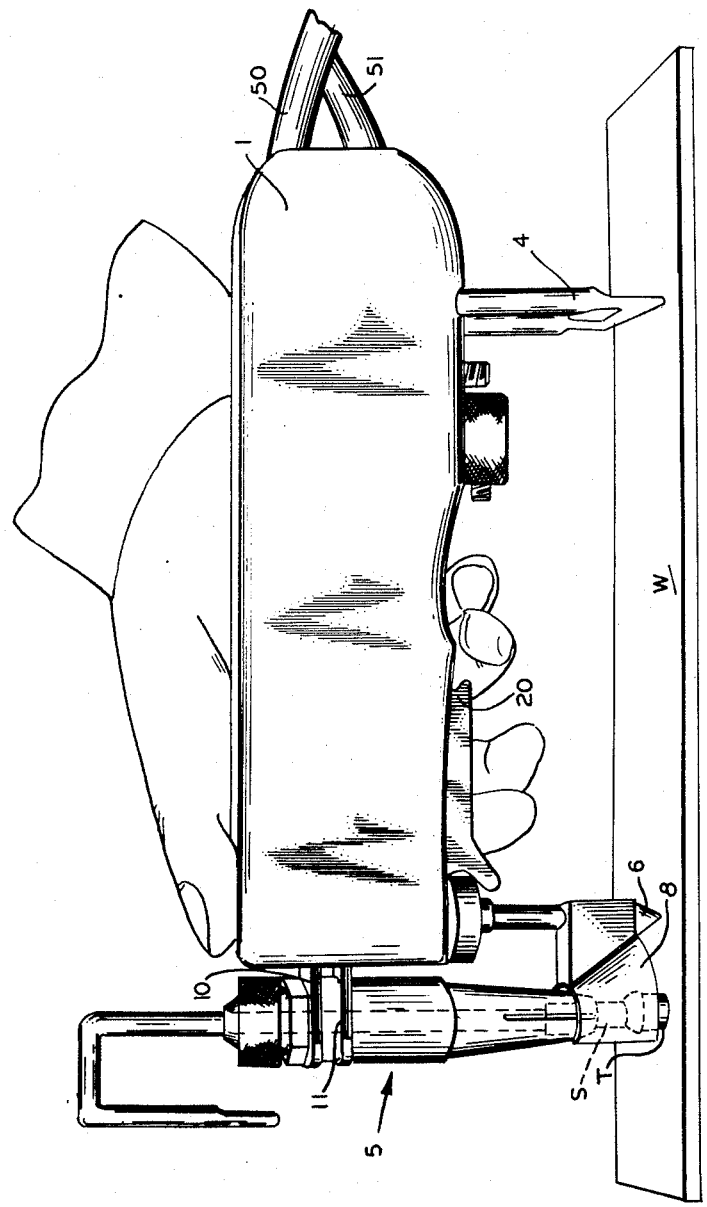
Figure 1 is a general perspective side view of a stud welding tool of the type used with the present invention shown in operative position against a work piece.

By way of background, the electric arc welding process with which the present invention is related calls for a stud to be positioned adjacent to a workpiece in the desired fastening location, application of a sufficient voltage across the stud and workpiece to initiate an arc between them, and after a definite period of time in which the end of the stud and the impact area on the work piece are heated by the current to a somewhat molten state, sharply forcing the end of the stud into the impact area on the workpiece to form the weld joint at which time the electric current is cut off.

More specifically the present invention relates to a known form of this process as disclosed in the above mentioned patents to Van Der Willigen, in which the time period, during which the arc and current are maintained, is controlled by a fusible flux-forming or slag-forming element T with a passage therethrough positioned between the stud S and the workpiece W. As indicated in the referenced patents this slag-forming or timer element T is capable of conducting electrical current in at least one direction and also by means of a passageway therethrough with an abutment, is capable of supporting the stud S which is backed up by a spring means forcing the stud S against the timer T and toward the workpiece. The relative position of these elements are disclosed in Figures 2, 3, 4 and 5.

Upon application of the voltage across the stud S, timer element T and workpiece W, a current is first conducted through the slag-forming timer element T and later directly between the stud S and workpiece W, in the form of an arc which is set up in the central passageway in the timer element T. The arc accomplishes two things principally; the first is the softening or partial melting of the end of the stud nearest the workpiece and also of the impact area on the workpiece; the second is the deterioration or fusing of the flux-forming timer T to the point where it can no longer prevent the spring-urged stud from moving into contact with the impact area on the workpiece. The impact of the softened end of the stud S into the softened impact area on the workpiece W results in the fusing of the stud to the workpiece forming the weld. Simultaneously with stud movement, or shortly thereafter, the current is shut off to complete the cycle of operation.

The term workpiece referred to herein means any metallic surface or member to which it is desired to attach a stud or fastener pin.

The studs or fasteners are metallic and may be in any desired form, the most usual being elongated and cylindrical and at times threaded at one end.

The tool by which the process is carried out generally consists of a chuck or holding device for one end of the stud, means for forcing the stud toward the workpiece means for allowing support and manipulation by an operator and the necessary circuit means to apply the voltage and supply the current required to carry out the welding cycle.

The details of the tool are not important to the present invention, the construction of certain of these tools being known. The particular tool shown in Figure 1 is fully described in the copending Hartman application for patent Serial No. 717,634 filed February 26, 1958.

Discussing the tool briefly, it consists of a housing 1 of insulating material, a chuck means 5 mounted on leaf springs 10 and 11 which extend through the opening 9 in the end of the housing 1. Workpiece engaging portions 4 and 6 are provided on the tool. A trigger or manual control element 20 is pivotally mounted in the housing 1. Usually the trigger element 20 in a control circuit 51 actuates a remote relay in the main power circuit 50 to carry out the welding cycle. The element 8 is a flash shield for protection of the operator's hand.

The slag-forming or flux-forming timer element T, hereinafter referred to as the timer element is an important unit in carrying out the welding process and is the item with which the present invention is most directly concerned. An enlarged showing of the timer element in cooperative association with the end of a stud is shown in Figure 5. Other views are illustrated in Figures 6, 7, 10 and 11.

The main component of the timer element is the solid refractory material portion 82 of conductive or semi-conductive composition. Examples of this composition are known and are fully disclosed in the referenced patents to Van Der Willigen. The refractory material portion 82 is provided with a central passageway 84 therethrough. In the passageway is formed a supporting shoulder or abutment 85 for receiving and supporting one end of a stud S. A paper or cardboard collar 81 is secured to the exterior of the refractory material portion 82. The extremity of the collar 81 being folded inwardly through an angle of about 180 degrees forms a frictional securing means 83 for the end of a stud. In carrying out the welding process the timer assembly T is secured to the end of the stud S so that the axis of the stud is aligned with the passageway 84 through the timer and the end of the stud S is engaged with the shoulder 85 in the passageway to limit movement of the stud into the passageway.

When the tool holding the stud and timer is positioned against a workpiece and the power supplied to the tool and stud by actuation of the tool trigger element, the timer element conducts the current initially, and its ionization assists in initiating an arc between the stud end and the work piece in the passageway. After the arc is established the timer element performs a shielding function and contains the arc. The most important function performed by the timer element is its controlled deterioration by the arc to the point at which the shoulder 84 disappears to release the stud to strike against the workpiece. By carefully controlling the composition and dimensions of the timer element, for a given voltage the time of duration of the arc and consequently the degree of heating of the stud and workpiece can be very accurately controlled to make proper welds without any additional or exterior timing means.

In the past the expanding gases, molten metal and slag caused by the arc have broken through the timer wall at its weakest point and blown the molten weld metal away from the desired area of application. This results in a non-uniform fillet and incomplete weld, known as an "undercut" and illustrated in Figure 9.

We have discovered that by providing a plurality of radial vent apertures 85 in the timer wall as illustrated best in Figures 6 and 7, that this previously encountered defect can be overcome consistently and stronger, better appearance welds completed. The vents are of sufficient size to allow a uniform radial expansion of the gases and molten matter in all directions without plugging up to prevent a concentrated "blow out" at one point. The vents may take a number of forms as shown in Figures 10 and 11. The area of the vent apertures must bear a ratio to the internal volume of the timer such that the gas generated during or expanded by the welding operation can escape without breaking out a side of the timer and create the objectionable unsymmetrical flow of metal resulting in defective welds. It has been determined that this numerical ratio should not be below about 4 to 1 for satisfactory functioning of the welding process, the volume and area being given in the same system of measurements, i.e. square inches and cubic inches respectively.

One satisfactory example for a ⅜" nominal diameter timer element requires that the height of the vents be more than .035" above the timer base and width of vent should not be more than .200" for a four slot configuration as shown in Figure 6. The corresponding limitations on the vent dimensions for timer elements of different sizes will generally be in proportion to the interior volumes of the different size timers, or to the square of the inner diameters of the timers.

The use of the timer elements with the radial venting results in a higher percentage of good welds, better appearing welds and a safer operation in that the flash and spewing of molten particles is greatly reduced.

In compliance with the patent statutes we have illustrated and described preferred forms of embodiment of our invention, but it is to be understood that various modifications and changes could be made therefrom without departing from the spirit of the invention or the scope of the appended claim.

We claim:

An improved slag-forming fusible solid member for conducting current between a stud and a workpiece to initiate the arc and control the arc duration in a process of the type disclosed for welding a stud to a workpiece, said member comprising an annular wall portion partly defining an interior space and having one end adapted to engage the surface of a workpiece, an inwardly extending annular abutment on said wall portion spaced from said one end and arranged to engage and support a fastener pin inserted from the other end of said member, vent means extending through said wall portion of sufficient cross-sectional area to provide for the free unimpeded escape of heated gases and molten materials from the interior space without plugging of said vent means by molten materials during the welding cycle, the cross-sectional area of said vent means being of a magnitude which bears a numerical value of substantially 400% of the numerical value for the volume of the interior space of said member.

References Cited in the file of this patent

UNITED STATES PATENTS

| | | |
|---|---|---|
| 2,416,204 | Nelson | Feb. 18, 1947 |
| 2,509,999 | Willigen et al. | May 30, 1950 |
| 2,510,000 | Willigen et al. | May 30, 1950 |
| 2,829,234 | Blink | Apr. 1, 1958 |

FOREIGN PATENTS

| | | |
|---|---|---|
| 167,251 | Australia | Mar. 15, 1956 |
| 762,252 | Great Britain | Nov. 28, 1956 |